United States Patent
Faddegon

(10) Patent No.: US 10,785,611 B1
(45) Date of Patent: Sep. 22, 2020

(54) METHOD AND CLOUD SERVICE FOR UPDATING A CLOUD COMPONENT

(71) Applicant: MOTOROLA SOLUTIONS, INC., Chicago, IL (US)

(72) Inventor: Maarten Faddegon, Copenhagen (DK)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/429,237

(22) Filed: Jun. 3, 2019

(51) Int. Cl.
*H04W 4/08* (2009.01)
*H04W 4/10* (2009.01)
*H04L 29/08* (2006.01)

(52) U.S. Cl.
CPC .............. *H04W 4/08* (2013.01); *H04L 67/10* (2013.01); *H04W 4/10* (2013.01)

(58) Field of Classification Search
CPC ............ H04W 4/08; H04W 4/10; H04L 67/10
See application file for complete search history.

(56) References Cited

U.S. PATENT DOCUMENTS

| | | | |
|---|---|---|---|
| 6,185,601 B1 | 2/2001 | Wolff | |
| 6,227,151 B1* | 5/2001 | Ma | F02B 17/00 123/3 |
| 8,595,283 B2 | 11/2013 | Inkinen et al. | |
| 9,923,867 B2* | 3/2018 | Folco | H04L 63/02 |
| 10,452,306 B1* | 10/2019 | Natanzon | G06F 3/0619 |
| 2012/0110055 A1* | 5/2012 | Van Biljon | G06Q 30/04 709/201 |
| 2013/0110778 A1* | 5/2013 | Taylor | G06F 11/1435 707/624 |
| 2013/0227085 A1* | 8/2013 | Choi | H04L 67/02 709/219 |
| 2014/0007072 A1* | 1/2014 | Chhabra | G06F 8/65 717/171 |
| 2014/0052837 A1* | 2/2014 | Prasad | H04L 67/1008 709/223 |
| 2014/0172405 A1* | 6/2014 | Baset | G06F 11/3409 703/22 |
| 2014/0173112 A1* | 6/2014 | Seago | H04L 67/32 709/226 |

(Continued)

OTHER PUBLICATIONS

The International Search Report and the Written Opinion corresponding patent application No. PCT/US2020/031451 filed May 5, 2020, dated Jul. 16, 2020, all pages.

*Primary Examiner* — Dominic E Rego

(57) ABSTRACT

A method and cloud service provide for upgrading a cloud component that is operably coupled to Land Mobile Radio (LMR) infrastructure equipment. A second cloud component is installed to replace a first cloud component. The first cloud component and the second cloud component operating simultaneously. The cloud service determines a first group of radios that are affiliated to a first talkgroup and a second group of radios that are affiliated to a second talkgroup, these radios currently utilizing the first cloud component. The cloud service prioritizes the first group of radios and the second group of radios to migrate to the second cloud component to obtain a first prioritized group and a second prioritized group. Each radio of the first prioritized group is migrated to the second cloud component before each radio of the second prioritized group.

20 Claims, 2 Drawing Sheets

(56) References Cited

U.S. PATENT DOCUMENTS

| | | | |
|---|---|---|---|
| 2015/0215269 A1* | 7/2015 | Chong | H04L 41/0659 |
| | | | 709/225 |
| 2016/0105044 A1* | 4/2016 | Yamaguchi | H02J 7/0016 |
| | | | 320/112 |
| 2016/0204923 A1* | 7/2016 | Ashok | G06F 9/45558 |
| | | | 709/226 |
| 2017/0031600 A1* | 2/2017 | Kesavan | G06F 3/0665 |
| 2017/0091486 A1* | 3/2017 | Clarke | G06F 21/54 |
| 2017/0093971 A1* | 3/2017 | Feinberg | H04L 67/1095 |
| 2018/0191550 A1 | 7/2018 | Vempati et al. | |
| 2018/0191865 A1* | 7/2018 | De Gaetano | G06F 11/2025 |
| 2018/0249302 A1 | 8/2018 | Pai et al. | |
| 2018/0260253 A1* | 9/2018 | Nanda | G06F 9/5027 |
| 2018/0322169 A1* | 11/2018 | Kaufman | H04L 67/36 |
| 2019/0266014 A1* | 8/2019 | Bahl | G06N 5/04 |

* cited by examiner

METHOD AND CLOUD SERVICE FOR UPDATING A CLOUD COMPONENT

BACKGROUND OF THE INVENTION

A Backup Push-To-Talk (BPTT) cloud service may include multiple microservices that can be updated independently. A BPTT microservice is responsible for a connection with a customer's on-premises Land Mobile Radio (LMR) infrastructure, preferably through a multicast terminator or cloud connector that acts as a site.

When upgrading a microservice, a new microservice is typically spawned side-by-side the old microservice, and both preferably run simultaneously for a period of time. The upgraded microservice typically connects as a different site. New radios that connect to BPTT service are preferably registered to the new site.

Radios that are connected to the old BPTT microservice can be migrated to the new BPTT microservice, preferably by generating a registration and affiliation over the new BPTT microservice. However, this process generates a significant load on a zone controller, and if a large number of radios are migrated at the same time the zone controller can be overwhelmed. In addition, if a radio is in a group call while being migrated to the new BPTT microservice, audio can be missed by that radio.

Therefore a need exists for a way of bringing a new BPTT microservice online without overwhelming the zone controller and without causing a radio to miss audio during a call.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
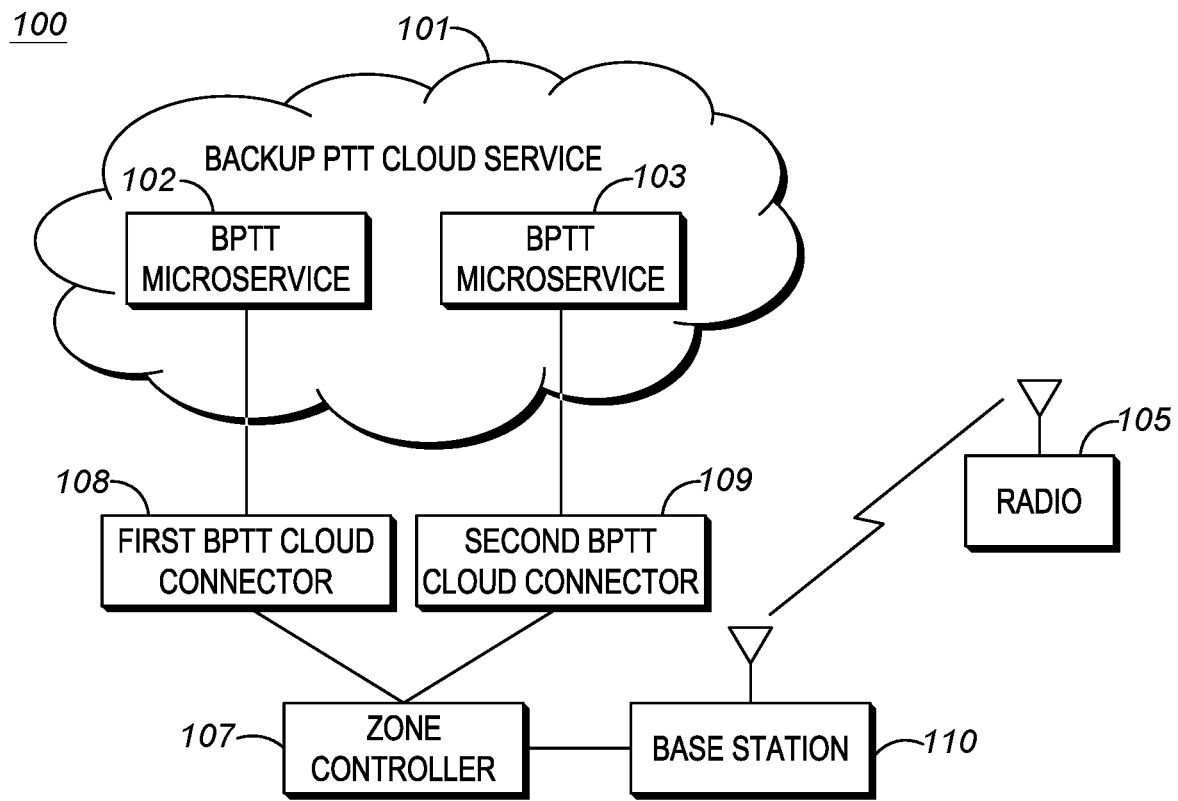
FIG. 1 depicts a system diagram of a communication system in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

FIG. 1 depicts a system diagram of a communication system 100 in accordance with an exemplary embodiment of the present invention. Communication system 100 preferably includes Backup Push To Talk (BPTT) Cloud Service 101, BPTT Microservice 102, BPTT Microservice 103, Radio 105, Zone Controller 107, First BPTT Cloud Connector 108, Second BPTT Cloud Connector 109, and a Base Station 110. It should be understood that communication system 100 would typically include many more radios and base stations, but only one of each is included for clarity. Communication system 100 provides for rate controlled migration of radios for seamless upgrade of BPTT microservices to protect Zone Controller 107 from being overwhelmed by migration requests from radios migrating from First BPTT Cloud Connector 108 to Second BPTT Cloud Connector 109.

BPTT Cloud Service 101 provides a mechanism to tunnel Land Mobile Radio (LMR) signaling and voice over Internet Protocol (IP) into the LMR core, specifically to Zone Controller 107. In an exemplary embodiment, a radio with an IP connection can operate together and communicate with radios on an LMR network. The IP connection can be, for example, a Wi-Fi connection, an LTE connection, or a satellite link. BPTT Cloud Service 101 can act as a backup and redundancy service, and can also act as a range extender.

In accordance with an exemplary embodiment, BPTT Microservice 102 and BPTT Microservice 103 are microservices. As used herein, the terms "cloud component" and "microservice" are used interchangeably. BPTT Microservice 102 and BPTT Microservice 103 assist in establishing secure containers in BPTT Cloud Service 101. As used herein, a microservice is a process that communicates with another microservice to accomplish a goal within BPTT Cloud Service 101. Microservices are typically small software modules that utilize lightweight protocols. BPTT Microservice 102 and BPTT Microservice 103 each preferably include a transceiver and a processor coupled to the transceiver. BPTT Microservice 102 is coupled to First BPTT Cloud Connector 108 and BPTT Microservice 103 is coupled to Second BPTT Cloud Connector 109.

Radio 105 is a mobile device such as a cell phone or two-way radio. Radio 105 is operably connected to Zone Controller 107 via base station 110 and can make and receive calls over a radio frequency link while a user is moving within a telephone service area served by BPTT Cloud Service 101.

Zone Controller 107 controls a trunked system, such as a site or sub-system. Zone Controller 107 is preferably the master controller for all call processing activity at BPTT Cloud Service 101 and is where all network links are terminated. Zone Controller 107 allows for efficient use of channels at each site using dynamic site assignment. In dynamic site assignment, Zone Controller 107 determines whether a site needs to broadcast a call. To facilitate this, radios are required to affiliate whenever they power-up, change channels, or change sites. When a talkgroup call is received, Zone Controller 107 determines which site that talkgroup is registered at and routes that audio via a switch to the appropriate channel at the site.

First BPTT Cloud Connector 108 and Second BPTT Cloud Connector 109 connect Backup BPTT Cloud Service 101 with the LMR core, Zone Controller 107. Depending on properties of the LMR core and system security policies, First BPTT Cloud Connector 108 and Second BPTT Cloud Connector 109 can serve multiple functions. In a first exemplary embodiment, First BPTT Cloud Connector 108 and Second BPTT Cloud Connector 109 are responsible for initiating a connection through a firewall into BPTT Cloud Service 101. In a second exemplary embodiment, First BPTT Cloud Connector 108 and Second BPTT Cloud Connector 109 are responsible for routing traffic between BPTT Cloud Service 101 and LMR components, such as Zone Controller 107 and base station 110. In a third exemplary embodiment, First BPTT Cloud Connector 108 and Second BPTT Cloud Connector 109 are responsible for sending and receiving traffic with a unicast connection when a radio requests to join or leave a multicast group.

Base station 110 provides the connection between radio 105 and Zone Controller 107. In an exemplary embodiment, base station 110 is a wireless communications station installed at a fixed location.

Figure 2:
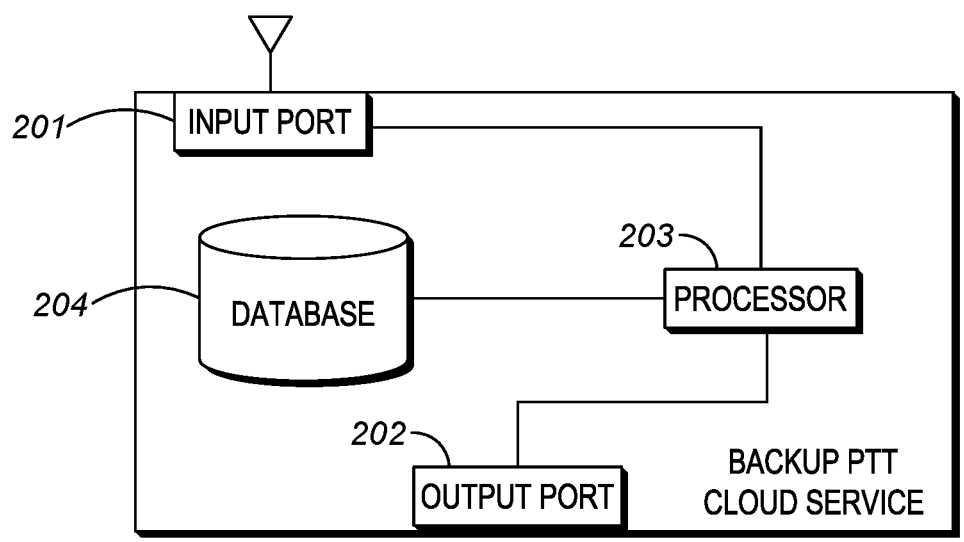
FIG. 2 depicts a backup PTT cloud service in accordance with an exemplary embodiment of the present invention.

FIG. 2 schematically illustrates BPTT Cloud Service 101 in more detail. In the exemplary embodiment depicted in FIG. 2, BPTT Cloud Service 101 includes an input port 201, an output port 202, a processor 203, and a database 204. Processor 203 and database 204 communicate over one or more communication lines or buses. Wireless connections or a combination of wired and wireless connections are also possible.

Input port 201 receives electronic signals from one or more wired or wireless communication networks, from First BPTT Cloud Connector 108, from Second BPTT Cloud Connector 109, or from a communication device such as radio 105.

Output port 202 transmits signals to First BPTT Cloud Connector 108 and/or Second BPTT Cloud Connector 109, although it should be understood that output port 202 can be operably coupled to more than two multicast terminators.

Although depicted in FIG. 2 as two separate elements, input port 201 and output port 202 can be a single element, such as a transceiver that could be an LTE modem, an FM transceiver, or a Wi-Fi or Ethernet transceiver Processor 203 may include a microprocessor, application-specific integrated circuit (ASIC), field-programmable gate array, or another suitable electronic device. Processor 203 obtains and provides information (for example, from database 204 and/or input port 201), and processes the information by executing one or more software instructions or modules, capable of being stored, for example, in a random access memory ("RAM") area of database 204 or a read only memory ("ROM") of database 204 or another non-transitory computer readable medium (not shown). The software can include firmware, one or more applications, program data, filters, rules, one or more program modules, and other executable instructions. Processor 203 is configured to retrieve from database 204 and execute, among other things, software related to the control processes and methods described herein.

Database 204 can include one or more non-transitory computer-readable media, and may include a program storage area and a data storage area. The program storage area and the data storage area can include combinations of different types of memory, as described herein. In the embodiment illustrated, database 204 stores, among other things, instructions for processor 203 to carry out the method of FIG. 3.

Figure 3:
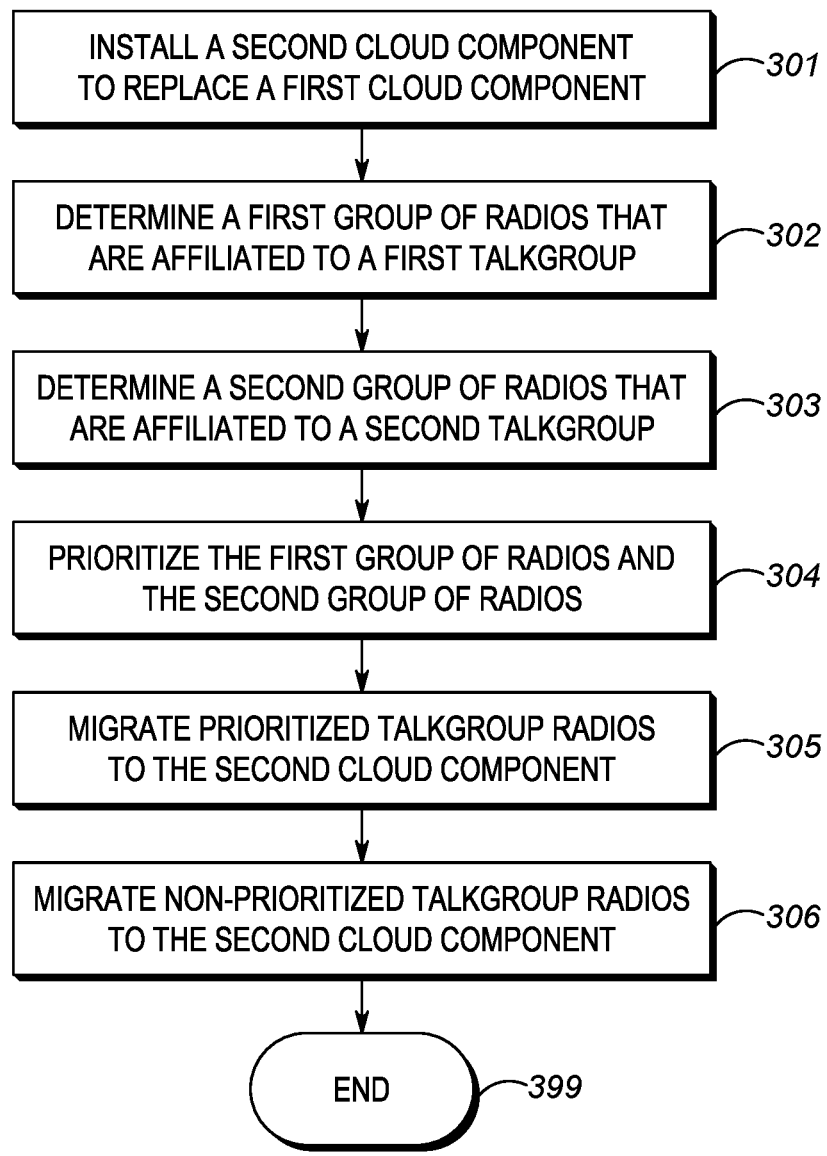
FIG. 3 depicts a flowchart in accordance with an exemplary embodiment of the present invention.

FIG. 3 depicts a flowchart 300 of a method for upgrading a cloud component that is operably coupled to Land Mobile Radio (LMR) infrastructure equipment. In this exemplary embodiment, the cloud component is a BPTT microservice, such as BPTT microservice 102, that is being upgraded to BPTT microservice 103.

BPTT Cloud Service 101 installs (301) a second cloud component to replace a first cloud component. In an exemplary embodiment, the second cloud component comprises BPTT microservice 103, which will ultimately replace BPTT microservice 102. The first cloud component and the second cloud component preferably operate simultaneously until all users are migrated from the first cloud component to the second cloud component.

BPTT Cloud Service 101 determines (302) a first group of radios that are affiliated to a first talkgroup. In an exemplary embodiment, the first group of radios are affiliated to the first talkgroup via the first cloud component.

BPTT Cloud Service 101 determines (303) a second group of radios that are affiliated to a second talkgroup. In an exemplary embodiment, the second group of radios are affiliated to the second talkgroup via the first cloud component.

BPTT Cloud Service 101 prioritizes (304) the first group of radios and the second group of radios to migrate to the second cloud component. In accordance with an exemplary embodiment, the prioritization occurs by making the highest priority for migration those groups on which no active group call is ongoing. By prioritizing groups in which no group call is active, data overhead between BPTT Cloud Service 101 and Zone Controller 107 is minimized.

In accordance with a further exemplary embodiment, the prioritization occurs by elevating the migration priority of radios affiliated to high-frequency talkgroups. In this exemplary embodiment, a talkgroup that is more active and processes more calls is more likely to have the next call over a talkgroup that processes fewer talkgroup calls.

In accordance with a further exemplary embodiment, the prioritization occurs by elevating the migration priority of emergency calls over non-emergency calls.

In accordance with a further exemplary embodiment, the prioritization occurs by elevating the migration priority of radios affiliated to a talkgroup for which it is longest since a group call was active. In this exemplary embodiment, assuming other factors are relatively equal, the group that has not had a call in the longest period of time would be more likely to have a call than a group that has had a call more recently.

In accordance with a further exemplary embodiment, the prioritization occurs by elevating the migration priority of radios based on criteria such as the total amount of subscribers currently being migrated, the number of subscribers on the old site affiliated to this group, whether there are subscribers affiliated to the group connected via the other site, and whether a time limit has been passed. For example, BPTT Cloud Service 101 might decide to force migration of all subscribers after a predetermined period of time.

BPTT Cloud Service 101 migrates (305) each radio of the prioritized talkgroup to the second cloud component. In accordance with an exemplary embodiment, the migration is accomplished by fabricating registration and affiliation PDUs for a seamless infrastructure upgrade. In accordance with an exemplary embodiment, BPTT Cloud Service 101 migrates a complete talkgroup to minimize differences between subscribers affiliated to the same talkgroup and to prevent the sending of the same audio streams twice from the infrastructure, for example once to the old microservice and once to the new microservice.

BPTT Cloud Service 101 migrates (306) each radio of the non-prioritized talkgroup to the second cloud component. In accordance with an exemplary embodiment, the migration is accomplished by fabricating registration and affiliation PDUs for a seamless infrastructure upgrade. The process then ends (399).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method for upgrading a cloud component that is operably coupled to Land Mobile Radio (LMR) infrastructure equipment, the method comprising:
    installing a second cloud component to replace a first cloud component, the first cloud component and the second cloud component operating simultaneously;
    determining a first group of radios that are affiliated to a first talkgroup and a second group of radios that are affiliated to a second talkgroup, the first group of radios and the second group of radios utilizing the first cloud component;
    prioritizing the first group of radios and the second group of radios to migrate to the second cloud component to obtain a first prioritized group and a second prioritized group; and
    migrating each radio of the first prioritized group to the second cloud component before migrating each radio of the second prioritized group to the second cloud component.

2. The method of claim 1, wherein the step of prioritizing comprises prioritizing based upon a call activity for the first prioritized group and the second prioritized group.

3. The method of claim 2, wherein the call activity comprises at least one of an observed group call type, an observed call state, a call frequency, and an inter-call interval.

4. The method of claim 1, wherein the step of prioritizing comprises prioritizing based upon a probability of upcoming call activity.

5. The method of claim 1, wherein the step of prioritizing comprises prioritizing based upon current call activity.

6. The method of claim 1, wherein the second group of radios includes a transferred radio that is utilizing the second cloud component, and wherein the step of prioritizing comprises prioritizing such that the second group of radios is the first prioritized group because of the presence of the transferred radio at the second cloud component.

7. The method of claim 1, wherein the step of prioritizing comprises prioritizing based upon a length of time since a last talkgroup call of the first group of radios and the second group of radios.

8. The method of claim 1, wherein the step of prioritizing comprises prioritizing based upon a frequency of calls on the first group of radios and the second group of radios.

9. The method of claim 1, wherein the step of prioritizing comprises prioritizing based upon a type of call.

10. The method of claim 9, wherein the type of call is an emergency call.

11. A backup push-to-talk (BPTT) cloud service for upgrading a cloud component that is operably coupled to Land Mobile Radio (LMR) infrastructure equipment, the BPTT cloud service comprising:
   a processor that performs:
      installing a second cloud component to replace a first cloud component, the first cloud component and the second cloud component operating simultaneously;
      determining a first group of radios that are affiliated to a first talkgroup and a second group of radios that are affiliated to a second talkgroup, the first group of radios and the second group of radios utilizing the first cloud component;
      prioritizing the first group of radios and the second group of radios to migrate to the second cloud component to obtain a first prioritized group and a second prioritized group; and
      migrating each radio of the first prioritized group to the second cloud component before migrating each radio of the second prioritized group to the second cloud component.

12. The BPTT cloud service of claim 11, wherein the step of prioritizing comprises prioritizing based upon a call activity for the first prioritized group and the second prioritized group.

13. The BPTT cloud service of claim 12, wherein the call activity comprises at least one of an observed group call type, an observed call state, a call frequency, and an inter-call interval.

14. The BPTT cloud service of claim 11, wherein the step of prioritizing comprises prioritizing based upon a probability of upcoming call activity.

15. The BPTT cloud service of claim 11, wherein the step of prioritizing comprises prioritizing based upon current call activity.

16. The BPTT cloud service of claim 11, wherein the second group of radios includes a transferred radio that is utilizing the second cloud component, and wherein the step of prioritizing comprises prioritizing such that the second group of radios is the first prioritized group because of the presence of the transferred radio at the second cloud component.

17. The BPTT cloud service of claim 11, wherein the step of prioritizing comprises prioritizing based upon a length of time since a last talkgroup call of the first group of radios and the second group of radios.

18. The BPTT cloud service of claim 11, wherein the step of prioritizing comprises prioritizing based upon a frequency of calls on the first group of radios and the second group of radios.

19. The BPTT cloud service of claim 11, wherein the step of prioritizing comprises prioritizing based upon a type of call.

20. The BPTT cloud service of claim 19, wherein the type of call is an emergency call.

* * * * *